United States Patent [19]

Müller et al.

[11] Patent Number: 4,954,255
[45] Date of Patent: Sep. 4, 1990

[54] FILTERING APPARATUS WITH PLEATED FILTERING MATERIAL

[75] Inventors: Roger Müller, Aedermannsdorf; Giancarlo Bee, Welschenrohr, both of Switzerland

[73] Assignee: S.F. Müller & Partner, Egerkingen, Switzerland

[21] Appl. No.: 326,222

[22] Filed: Mar. 20, 1989

[30] Foreign Application Priority Data

Apr. 2, 1988 [CH] Switzerland .................. 01227/88
Oct. 15, 1988 [CH] Switzerland .................. 03838/88

[51] Int. Cl.$^5$ .............................................. B01D 27/06
[52] U.S. Cl. ............................... 210/437; 210/493.5; 210/494.1; 210/497.2; 55/498; 55/501
[58] Field of Search .................. 55/475, 497, 498, 500, 55/521; 210/321.77, 321.86, 47, 455, 457, 483, 487, 493.1, 493.2, 493.5, 497.01, 497.2, 494.1

[56] References Cited

U.S. PATENT DOCUMENTS

| | | | |
|---|---|---|---|
| 2,914,179 | 11/1959 | Foust | 210/493.1 |
| 3,302,796 | 2/1967 | Downey | 210/487 |
| 3,385,038 | 5/1968 | Dauis | 210/493.1 |
| 3,950,256 | 4/1976 | Read | 210/493.5 |
| 4,488,966 | 12/1984 | Schaeffer | 55/498 |
| 4,560,477 | 12/1985 | Maldon | 55/498 |
| 4,619,676 | 10/1986 | Turck | 210/493.1 |
| 4,652,285 | 3/1987 | Greene | 210/493.1 |

FOREIGN PATENT DOCUMENTS 2900081 7/1979 Fed. Rep. of Germany .
619152 9/1980 Switzerland .

Primary Examiner—Richard V. Fisher
Assistant Examiner—Wanda L. Millard
Attorney, Agent, or Firm—Werner W. Kleeman

[57] ABSTRACT

The filtering apparatus comprises at least one filtering material pleated in fanfold formation and arranged between the inflow or upstream side and the outflow or downstream side. Each pleat open toward the inflow or upstream side possesses a rounded base. The radius of the rounded base is in the range of 0.05 to 0.3 times the pleat depth. Each pleat open toward the outflow or downstream side terminates in an acute angle. A dimensionally stable insert is positioned within each pleat which is open toward the outflow or downstream side. The insert is preferably formed of flat material and comprises bilaterally protuberant deformations. The inserts are provided with bores at least at the protuberant deformations. Each of the inserts space the two confronting downstream sides of the associated filtering pleat and prevent that the filtering material, at high-pressure conditions, is pressed together and becomes impervious at the locations pressed against the inserts. In this filtering apparatus, filter cake consisting of filtered-out particles is easily separated and removed from the filtering material in a cleaning operation performed by a medium flowing from the outflow side to the inflow side of the filtering apparatus.

12 Claims, 3 Drawing Sheets

FILTERING APPARATUS WITH PLEATED FILTERING MATERIAL

BACKGROUND OF THE INVENTION

The present invention broadly relates to removable fluid filters and, more specifically pertains to a new and improved filtering apparatus or filter having a filtering material arranged in pleated or zig-zag form.

Generally speaking, the apparatus of the present invention is of the type comprising at least one filtering material pleated in fanfold or zig-zag manner and arranged between the inflow or upstream side and the outflow or downstream side of the filtering apparatus.

Such a filtering apparatus is known, for example, from German Published Patent Application No. 2,900,081, published July 19, 1979. A two-component filtering element pleated in zig-zag formation is arranged between the inlet side and the outlet side of the filter. The inner or downstream component of the two-component filtering element is a flexible thin supporting layer of high mechanical strength. The pleated filtering layer and the pleated supporting layer are in surface-to-surface contact at least during filtration of a medium passing from the filtering layer to the supporting layer, without these layers being connected or joined to one another. During a cleaning operation, a flow of cleansing medium, which is often compressed air, is directed in the opposite direction from the inner supporting layer to the outer filtering layer. The filtering layer is thereby inflated such that the filtering pleats which are open toward the operational inflow side narrow or converge and the separation of the filter cake consisting of the filtered-out material is rendered difficult if not impossible due to the material wedged or lodged between the contiguous sides of the filtering pleats. In those instances where there occurs a failure to remove such enclosed portions of the filter cake, then, the pressure of the cleansing medium is increased, but this can cause the filtering material to tear or rupture. This known filter possesses a relatively complicated and expensive two-component combination of a filtering layer and a supporting layer and can be therefore generally considered uneconomical to manufacture.

A further filter element or filter is known from Swiss Pat. No. 619,152, published Sept. 15, 1980. The filter disclosed therein consists of an inner layer of filtering paper and an outer supporting layer arranged at the inflow or upstream side of the filtering paper. Both layers are adhesively bonded to one another. This relatively expensive design is also uneconomical to manufacture. In a cleaning operation for this filter, there is normally provided compressed air which flows in a direction opposite to the direction of flow of the medium to be filtered, in order that the filter cake is separated from the filter surface. In this known filter, the filter cake is located at the surface of the pleated stiff supporting layer and a relatively high pressure of the cleansing medium must be provided to remove such filter cake. This would require correspondingly costly pressure generating and distributing devices as well as a corresponding constructional expenditure for the provision of the requisite safety measures or arrangements. The filter cake is difficult to remove from the stiff supporting layer formed of expanded material, in the mesh of which the filter cake is lodged or anchored.

An insert for fluid filter cartridges having a pleated filtering material arranged at the inflow or upstream side of a solid supporting body pervious to gas and/or liquids is known, for example, from U.S. Pat. No. 3,302,796, granted Feb. 7, 1967. At the outflow or downstream side of the filtering material, wherein such outflow or downstream side faces the supporting body, there is provided in each filtering pleat or fold, a dimensionally stable insert or spacer formed of a flat sheet of material provided with bilaterally or double-sided protuberant deformations. Such a flat sheet of material can be formed of metal or plastic material and the inserts or spacers can possess, for example, a corrugated or zig-zag configuration. The wave troughs or zig-zag edges extend perpendicular or inclined to the surface of the supporting body. On the other hand, such inserts or spacers formed of a flat sheet of material are provided with bilaterally or double-sided projecting dimple-shaped protuberances. Upon throughflow and filtration of a highly viscous liquid by means of the still clean filtering material, or upon throughflow of a low viscous liquid or of a gas through the soiled and clogged filtering material, the filtering material is pressed against the surface of the inserts or spacers and the filtering material adapts to the protuberant surfaces of such inserts or spacers. Since the filtering material does not permit any throughflow at the locations pressed against the inserts or spacers, because the underlying inserts or spacers are impervious to liquids and/or gases, the flow resistance of the entire fluid filter cartridge increases such that the pressure at the inflow or upstream side of the filtering material increases even further. As a result, the filtering material is pressed to an even greater extent against the impervious inserts or spacers, thus decreasing the filtering effect of the fluid filter cartridge.

SUMMARY OF THE INVENTION

Therefore, with the foregoing in mind, it is a primary object of the present invention to provide a new and improved construction of a filtering apparatus which does not exhibit the aforementioned drawbacks and shortcomings of the prior art.

Another and more specific object of the present invention aims at providing a new and improved construction of a filtering apparatus of the previously mentioned type which possesses good operational characteristics and which allows separation and removal of the filter cake or other filtered out particles or the like from the filtering material to be easily accomplished during the cleaning operation by means of relatively low air pressure.

Yet a further significant object of the present invention aims at providing a new and improved construction of a filtering apparatus of the character described which is relatively simple in construction and design, extremely economical to manufacture, highly reliable in operation and not readily subject to malfunction and breakdown.

Now to implement these and still further objects of the invention, which will become more readily apparent as the description proceeds, the filtering apparatus of the present invention is manifested, among other things, by the features that each pleat or fold which is open toward the inflow or upstream side comprises a rounded base or bottom, the radius of which is in the range of 0.05 to 0.3 times the predetermined depth of the pleat or fold, and that each pleat or fold which is open toward the outflow or downstream side is formed to possess an acute angle.

This arrangement renders possible a relatively simple and easy separation of the filter cake or the like from the filtering material because, on the one hand, the pleats or folds which are open to the operational inflow or upstream side are substantially broad or wide and possess a rounded base or bottom or pleat edge and, on the other hand, the pleats or folds which are formed with an acute angle and open to the operational outflow or downstream side are relatively dimensionally stable, particularly in the tip or edge region thereof. The filter cake is not undesirably wedged or lodged in the pleats or folds during the cleaning or cleansing operation and the required air pressure to detach or separate the filter cake from the filtering material remains within moderate limits.

A dimensionally or inherently stable insert or spacer can be inserted or positioned within each pleat or fold which is open towards the outflow or downstream side. These inserts or spacers prevent the compression and collapse of the pleats or folds which are open in the direction of the outflow or downstream side of the filtering apparatus, during operational flow of the medium to be filtered.

The dimensionally or inherently stable insert or spacer can be formed of a substantially flat material comprising bilaterally or double-sided protuberant or projecting deformations. This substantially flat material is provided with holes or bores or the like at least at these bilaterally or double-sided protuberant or projecting deformations. These holes or bores or the like in such protuberant or projecting deformations of the insert or spacer, permit that the liquid or gas guided through the filtering material can also flow through the filtering material at such locations where the latter is pressed against the associated insert or spacer. As a result, an optimum filter effect and a relatively small flow resistance of the filtering cartridge can be achieved. Moreover, the inserts or spacers are of a simple construction and design and can be therefore economically manufactured.

The sum of the surfaces of the holes or bores can lie between 5% and 95% of the total surface of the substantially flat material. These holes or bores can be uniformly distributed at the substantially flat material which advantageously comprises a grid or lattice configuration.

The substantially flat material of the insert or spacer can be formed to possess a corrugated or wave-shaped or undulated configuration. The respective wave troughs are thereby aligned in perpendicular or inclined relationship to the surface of the supporting body.

The substantially flat material of the insert or spacer can comprise bilaterally or double-sided protuberant convex or bulbous-or buckle-shaped elevations or projections and at least these convex or bulbous-or buckle-shaped elevations or projections are provided with holes or bores or the like. A spacing of the contiguous sides of the filtering pleats or folds is advantageously achieved by this insert or spacer.

The dimensionally or inherently stable inserts or spacers are advantageously supported at the supporting body of the filtering cartridge. In a preferred embodiment of the filtering apparatus, each insert or spacer extends from the supporting body up to two thirds of the depth or height of the filtering pleats or folds.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
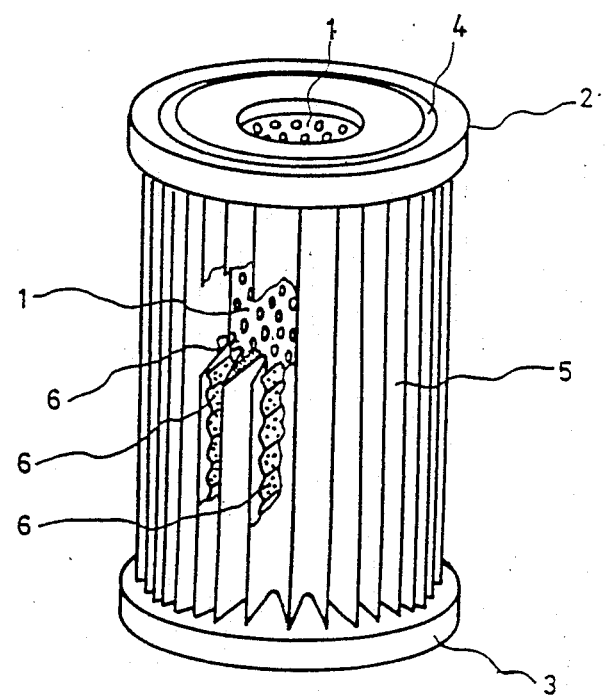
FIG. 1 is a perspective view of a complete filtering apparatus shown partially in section and constructed according to the invention.

Describing now the drawings, it is to be understood that to simplify the showing thereof, only enough of the structure of the filtering apparatus has been illustrated therein as is needed to enable one skilled in the art to readily understand the underlying principles and concepts of the present invention. Turning attention now specifically to FIG. 1 of the drawings, the filtering apparatus or filter structure illustrated therein by way of example and not limitation, will be seen to comprise a rigid substantially tubular-shaped supporting body or support 1 which is pervious to gases and/or liquids. This tubular-shaped supporting body or support 1 is arranged between two flanges or flange members 2 and 3, each of which can be provided with an appropriate but not here particularly illustrated sealing ring which can be inserted into a respective annular groove 4. Such flanges 2 and 3 provide the inner outflow-sided connection of the filter cartridge generally defined by the filtering apparatus. The outer inflow-sided connection of the filter cartridge renders possible a radial inflow of the gas or liquid to be filtrated into the tubular-shaped supporting body 1. For enhanced clarity of the showing of the perspective view in FIG. 1, the outer inflow-sided connection which is known per se is not particularly illustrated in the drawings.

A pleated or folded filtering material or filter body 5 formed of polyester or the like is mounted about the tubular-shaped supporting body 1 at the inflow side thereof. This pleated or folded filtering material 5 sealingly bears upon the two flanges 2 and 3. At the outflow or downstream side of the pleated or folded filtering material 5, such outflow or downstream side facing or confronting the tubular-shaped supporting body 1, there is provided a dimensionally or inherently stable insert or spacer 6 in each filtering pleat or fold, generally indicated by reference numeral 20. These dimensionally stable inserts or spacers 6 are clearly visible in the filtering pleats or folds 20 partially shown in section in FIG. 1. The inserts or spacers 6 are formed of a substantially flat plastic material and comprise bilaterally or double-sided protuberant or projecting deformations. The dimensionally or inherently stable inserts or spacers 6 space or keep apart the two facing contiguous sides of the filtering pleats or folds 20 and thus prevent that these pleats or folds are compressed or pressed together in the event of a relatively large pressure drop occurring at the filtering cartridge. A compression or collapse of these filtering pleats or folds 20 would render ineffective for filtration the greater part of the surface of the pleated or folded filtering material 5.

Figure 2:
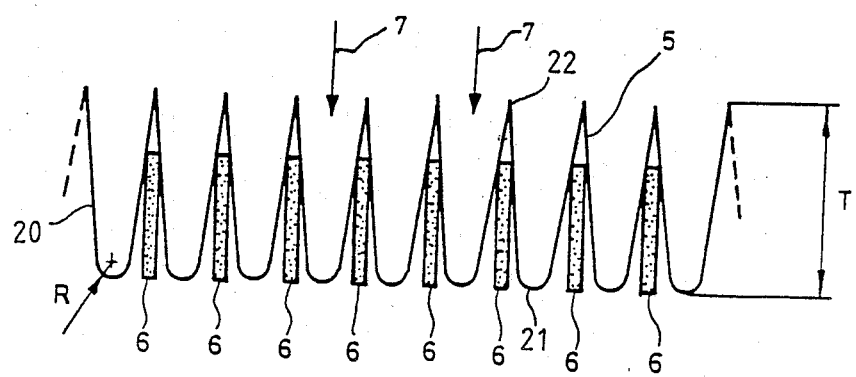
FIG. 2 is a schematic illustration of the pleated filtering material.

The pleated or folded filtering material 5 is schematically illustrated in FIG. 2, in which the inflow or upstream side is shown above and the outflow or downstream side is shown below the pleated or folded filtering material 5. The flow direction is generally indicated by the arrows 7. Each filtering pleat or fold 20 which is open toward the inflow or upsteam side of the pleated or folded filtering material 5, comprises a rounded base or bottom or pleat edge 21. The radius R of this rounded base or bottom or pleat edge 21 is 0.05 to 0.3 times the depth or height T of the associated pleat or fold 20. Each pleat or fold 20 which is open towards the outflow or downsteam side ends in a tip or edge 22 enclosing an acute angle. A dimensionally or inherently stable insert or spacer 6 is inserted or positioned in each pleat or fold 20 which is open toward the outflow or downstream side of the pleated or folded filtering material 5. In order to render possible that the pleated or folded filtering material 5 effectively filtrates at those locations where the latter is pressed against the protuberant or projecting deformations of the inserts or spacers 6, these inserts or spacers 6 are provided with holes or bores or the like at least at the protuberant or projecting deformations. This will be explained more fully hereinafter, for instance, with reference to FIG. 4.

Figure 3:
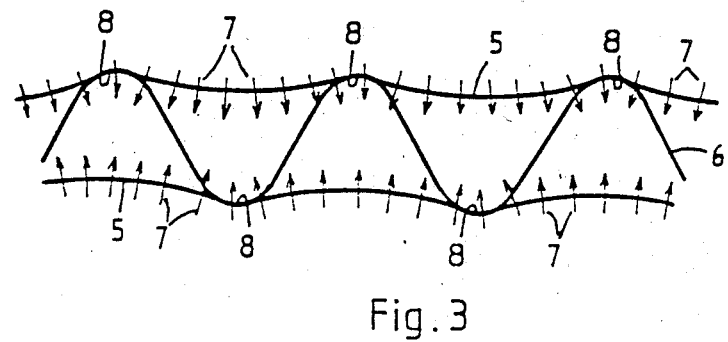
FIG. 3 is a schematic illustration of an insert or spacer with adjacent or adjoining filtering material.

In FIG. 3, there is schematically illustrated an insert or spacer 6 with the pleated or folded filtering material 5 bilaterally pressed thereat. The dimensionally stable insert or spacer 6 is positioned in a filtering pleat or fold and is illustrated as viewed in radial direction of the filtering cartridge. The small arrows 7 symbolize the operational direction of flow through the pleated or folded filtering material 5. By virtue of this inventive insert or spacer 6 provided with holes or bores at least at the protuberant deformations or undulatory or curved portions 8, the flow of the medium to be filtered can take place practically through the entire surface of the pleated filtering material 5.

Figure 4:
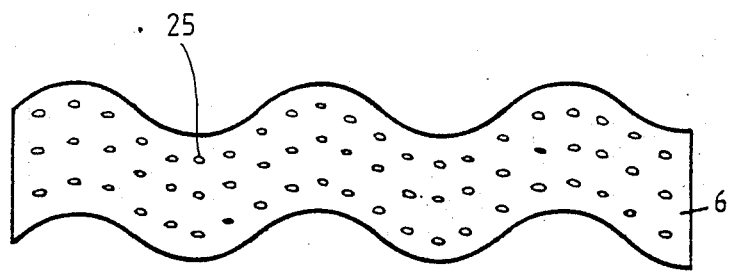
FIG. 4 is a perspective view of an insert or spacer provided with round holes or bores.

Depending on the shape or form of the dimensionally stable insert or spacer 6, the sum of the surfaces of the holes or bores at the protuberant or projecting deformations or undulatory portions, already when constituting 5% of the total surface of the flat material, can provide the desired perviousness of the pleated or folded filtering material 5. For practical reasons, there is often selected a corrugated or wave-shaped perforated strip 6 having uniformly distributed holes or bores 25 as depicted in FIG. 4. The respective wave troughs of the corrugated or wave-shaped strip 6 extend transverse to the longitudinal direction of the perforated strip 6 and, after insertion or positioning in the filtering apparatus, substantially perpendicular to the surface of the substantially tubular-shaped supporting body 1.

Figure 5:
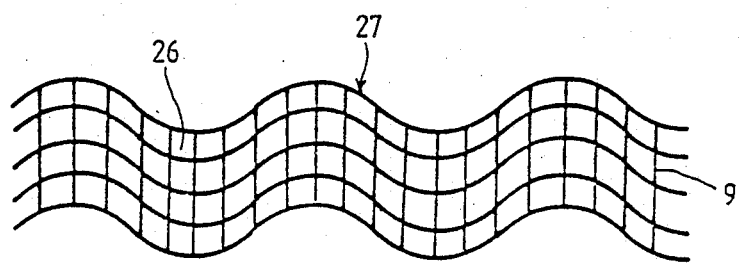
FIG. 5 is a perspective view of an insert or spacer having a grid or lattice configuration.

A likewise wave-shaped grid or lattice element 27 made of, for instance, plastic material and depicted in FIG. 5 can be used as an insert or spacer 9. The sum of the surfaces of the holes or bores or openings 26 can amount up to 95% of the total surface of this flat material. The wave troughs of this arrangement also lie transverse to the longitudinal direction of the substantially flat grid or lattice element 27 and, subsequent to assembly in the filtering apparatus, lie substantially perpendicular to the surface of the supporting body or support 1.

Figure 6:
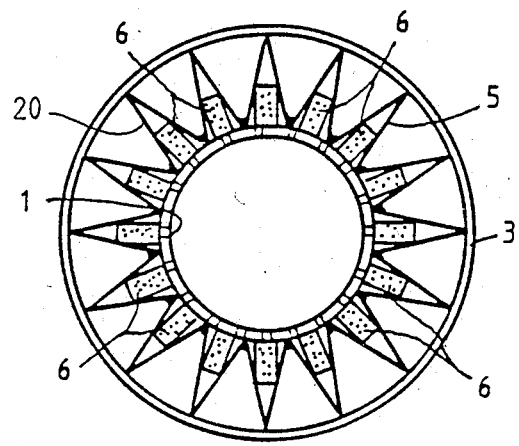
FIG. 6 is a cross-section of the filtering apparatus provided with inserts or spacers and constructed according to the invention.
Figure 7:
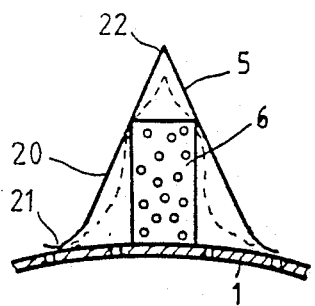
FIG. 7 is a cross-section of a filtering pleat or fold provided with an insert or spacer.

In FIG. 6 there is shown a schematic cross-section through the filtering apparatus constructed according to the invention. The inserts or spacers 6 are supported at the supporting body or support 1 and retained in the correct position by the filtering pleats or folds 20 of the pleated or folded filtering material 5. FIG. 7 shows, on an enlarged scale, a cross-section through a single or individual filtering pleat or fold 20. The insert or spacer 6 extends from the supporting body or support 1 up to two thirds of the depth or height of the associated filtering pleat or fold 20. By virtue of this structural design, it is readily possible to achieve very good filtering results by the filtering apparatus. Moreover, in FIG. 7, there is indicated in broken lines the manner in which the pleated filtering material 5 is deformed while undergoing an increasing pressure drop at or across the filtering cartridge. At a very high fluid pressure prevailing at the inflow or upstream side of the pleated filtering material 5, this pleated filtering material 5 is totally pressed against the dimensionally stable insert or spacer 6.

Figure 8:
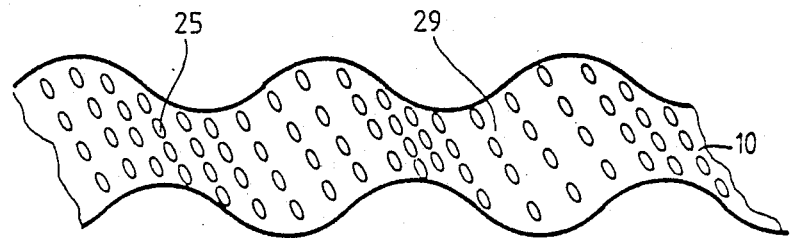
FIG. 8 is a schematic perspective illustration of a corrugated or wave-shaped or undulated insert or spacer provided with inclined wave troughs.

FIG. 8 shows a corrugated or wave-shaped insert or spacer 10 provided with holes or bores 25 and with wave troughs 29 extending inclinedly to the longitudinal direction of the perforated strip or band. After insertion of the insert or spacer 10, these wave troughs 29 are also inclinedly aligned with respect to the surface of the supporting body or support 1.

Figure 9:
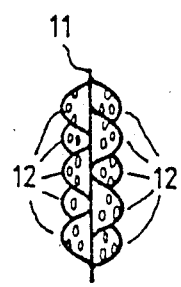
FIG. 9 is a schematic side view of an insert or spacer provided with bilaterally or double-sided protuberant convex or bulbous-or buckle-shaped elevations or projections.
Figure 10:
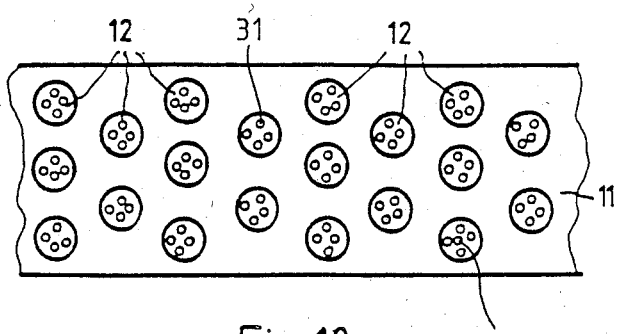
FIG. 10 is a schematic top plan view of the insert or spacer shown in FIG. 9.

FIGS. 9 and 10 show a further dimensionally stable insert or spacer 11 in a side view and a top plan view, respectively. This insert or spacer 11 consists of a substantially flat material which comprises bilaterally or double-sided protuberant convex or bulbous-or buckle-shaped elevations or projections 12 which are provided with holes or bores 31 or the like. To simplify the showing of FIGS. 9 and 10, not all identical elevations or projections 12 have been designated with the reference numeral 12. The elevations or projections 12 have such holes or bores 31 solely at the apex or dome portions thereof, such apex or dome portions representing the locations at which the pleated filtering material 5 nestles against the inserts or spacers 11 at high pressure differentials.

The hereinbefore described pleated filtering material 5 can be evidently also adapted to conically formed supporting bodies or supports. The inserts or spacers 6, 9, 10 and 11 can be used not only in round or cylindrical filtering cartridges, but also in flat or otherwise configured filtering cartridges having a pleated filtering or folded material 5 according to FIG. 2.

In the filtering apparatus constructed according to the invention, there is initially formed during operation, a first filtrate layer at the inflow or upstream side of the pleated filtering material 5. This filtrate layer acts as a pre-filter or coarse filter. By virtue of the rounded bottom or base portions, like the rounded base or bottom portions 21 of FIG. 2, of the inflow-sided open filtering pleats or folds 20, a relatively solid or compact filter cake builds up, which can be easily separated or detached. The cleaning of the filtering apparatus is accomplished by means of pressure from the outflow or downstream side of the pleated filtering material 5. The filter cake or the like can be separated and removed at relatively small pressure differentials between the two sides or faces of the pleated filtering material 5. Since the filtering pleats or folds which are open to the outflow or downstream side end in tips or edges, like the tips or edges 22 of FIG. 2, and each enclosing a respective acute angle, an inflation of the pleated filtering material 5 and thus a hindrance or obstacle to the separation of the filter cake can be beneficially prevented.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A filtering apparatus having an inflow side and an outflow side, comprising:
    at least one filtering material pleated in fanfold manner and arranged between the inflow side and the outflow side of the filtering apparatus;
    said at least one pleated filtering material containing a plurality of pleats which are open towards said inflow side and a plurality of pleats which are open towards said outflow side;
    each pleat of said at least one pleated filtering material having a predetermined pleat depth;
    each one of said plurality of pleats which are open towards said inflow side containing a rounded base;
    said rounded base having a radius in the range of 0.05 to 0.3 times said predetermined pleat depth;
    each one of said plurality of pleats which are open towards said outflow side being structured to possess an acute angle;
    a dimensionally stable insert positioned within said each one of said plurality of pleats which are open towards said outflow side;
    each said dimensionally stable insert is formed of a substantially flat material comprising bilaterally protuberant deformations; and
    at least said bilaterally protuberant deformations being provided with holes.

2. The filtering apparatus as defined in claim 1, wherein:
    said substantially flat material having a total surface area; and
    the sum of said holes having a surface area amounting to between 5% and 95% of the total surface area of said substantially flat material.

3. The filtering apparatus as defined in claim 2, wherein:
    said holes are substantially uniformly distributed at said substantially flat material.

4. The filtering apparatus as defined in claim 3, wherein:
    said substantially flat material possesses a grid configuration.

5. The filtering apparatus as defined in claim 4, wherein:
    said substantially flat material possesses a corrugated configuration.

6. The filtering apparatus as defined in claim 5, further including:
    a supporting body;
    said corrugated configuration containing wave troughs; and
    the wave troughs of said corrugated configuration being aligned substantially perpendicular to said supporting body.

7. The filtering apparatus as defined in claim 6, wherein:
    said dimensionally stable insert is supported at said supporting body.

8. The filtering apparatus as defined in claim 6, wherein:
    said dimensionally stable insert extends from said supporting body up to approximately two-thirds of said predetermined pleat depth.

9. The filtering apparatus as defined in claim 5, further including:
    a supporting body;
    said corrugated configuration having wave troughs; and
    the wave troughs of said corrugated configuration being inclinedly aligned with respect to said supporting body.

10. The filtering apparatus as defined in claim 9, wherein:
    said dimensionally stable insert is supported at said supporting body.

11. The filtering apparatus as defined in claim 9, wherein:
    said dimensionally stable insert extends from said supporting body up to approximately two-thirds of said predetermined pleat depth.

12. The filtering apparatus as defined in claim 2 wherein:
    said bilaterally protuberant deformations comprise bilaterally protuberant substantially bulbous-shaped elevations; and
    said substantially bulbous-shaped elevations being provided with said holes.

* * * * *